INVENTORS.
WILLIAM V. LOHRMAN

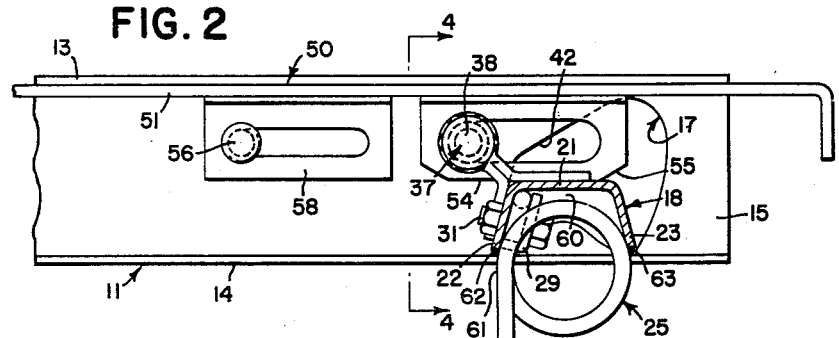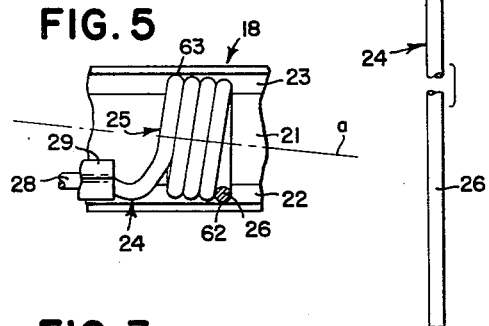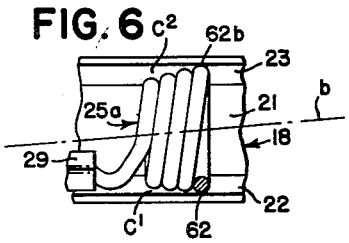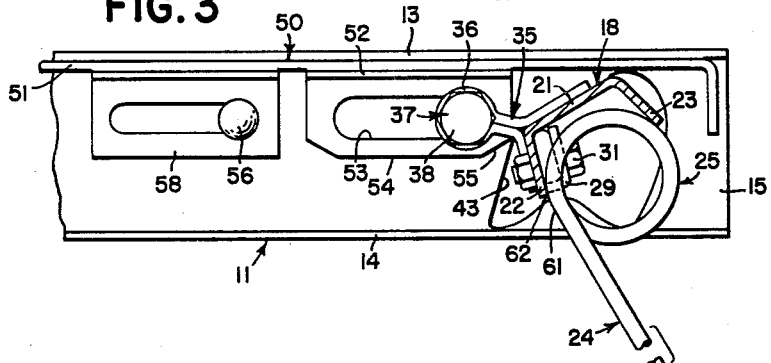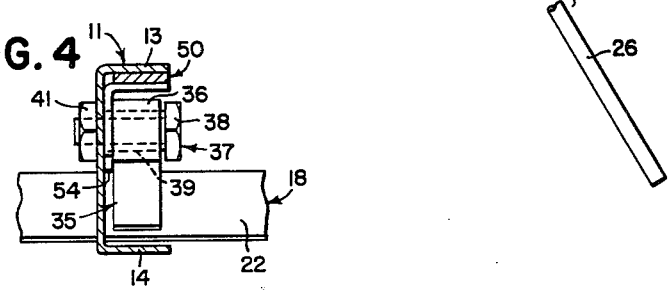

United States Patent Office
3,049,184
Patented Aug. 14, 1962

3,049,184
SPRING TOOTH AND TOOTH BAR CONSTRUCTION
William V. Lohrman, Davenport, Iowa, assignor, by mesne assignments, to Deere & Company, a corporation of Delaware
Original application June 30, 1958, Ser. No. 745,571, now Patent No. 3,016,958, dated Jan. 16, 1962. Divided and this application May 13, 1960, Ser. No. 29,053
5 Claims. (Cl. 172—707)

The application is a division of the co-pending application (A-2870), filed by William E. Knapp and myself, June 30, 1958, Ser. No. 745,571 for Harrows, now Patent No. 3,016,958, granted Jan. 16, 1962.

This invention relates generally to agricultural implements and more particularly to ground working tools of the harrow type.

The object and general nature of the present invention is the provision of a cultivating implement in the form of a spring or flexible tooth harrow in which a new and improved tooth mounting means for coil spring teeth provides a frictional snubbing action that reduces the rebound after a tooth or tine clears an obstruction, and hence tooth breakage is substantially eliminated. More specifically, a further feature of this invention is the provision of a coil spring tooth arrangement for harrows, wherein the coils are so constructed and arranged as to be resiliently held in frictional contact with the associated supporting tooth bars only at the sides of the coil, whereby the aforesaid frictional snubbing action is always available.

These and other objects and advantages of the present invention will be apparent to those skilled in the art after a consideration of the following detailed description, taken in conjunction with the accompanying drawings, in which:

FIG. 2 is a sectional view taken generally along the line 2—2 of FIG. 1, showing the locking means holding the harrow teeth in their vertical position, the tooth coil being shown somewhat diagrammatic.

FIG. 3 is a view similar to FIG. 2, showing the locking means in the position accommodating rearward swinging of the tooth bars to provide for angling the harrow teeth, the tooth coil being shown somewhat diagrammatic.

FIG. 4 is a section taken along the line 4—4 of FIG. 2.

FIG. 5 is a fragmentary view taken generally along the line 5—5 of FIG. 1, showing one way the spring coils are disposed to secure the desired frictional snubbing action that limits tooth rebound.

FIG. 6 is a view similar to FIG. 5 showing a modified spring tooth construction.

Figure 1:
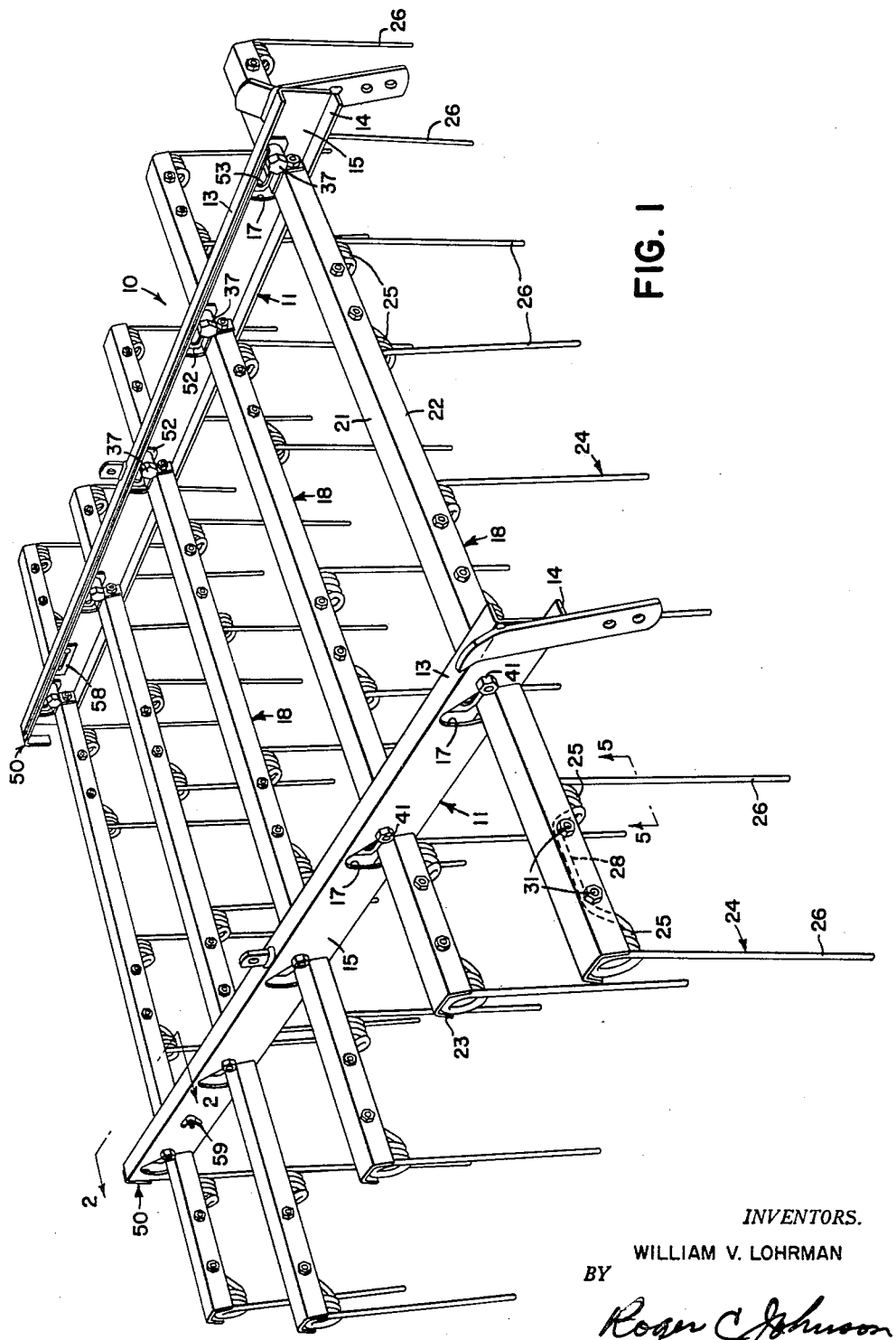
FIG. 1 is a perspective view of a flexible spring tooth harrow in which the principles of the present invention have been incorporated.

Referring first to FIG. 1, the frame of the harrow is indicated in its entirety by the reference numeral 10 and comprises a pair of longitudinally extending beam members 11 that preferably are in the form of channels disposed in a vertical position, with upper and lower flanges 13 and 14 disposed horizontally and extending laterally inwardly. The web sections 15 of the channels 11 are apertured, as indicated at 17, to receive a plurality of tooth bars 18. Each of the bars 18 is formed with a flat or web portion 21 and downwardly and outwardly extending front and rear flanges 22 and 23. The several tooth bars 18 extend through the openings 17 in the beam members, and each tooth bar 18 carries a plurality of spring tooth members 24. Each of these members comprises a pair of coiled sections 25 the laterally outer ends of which terminate in soil working tines 26. The inner ends of the coil sections 25 are inter-connected by a transverse portion 28 that is shaped to fit flat against the front flange 22 of the associated tooth bar 18 and receive a clamp member 29. The latter is apertured to receive a pair of bolts 31 that serve as fastening means for clamping each tooth member 24 in position to the forward tooth bar flange 22.

Each tooth bar 18 is pivotally connected to the associated channel beams 11 so as to rock or swing relative thereto about an axis that lies forwardly of the openings 17 through which the tooth bar extends. For this purpose, we provide for each tooth bar 18 a pair of apertured lugs 35 welded to the forward flange 22 and to the upper or flat portion 21 of each tooth bar 18 so as to extend generally forwardly and upwardly, terminating in an apertured portion 36 through which a pivot stud 37 extends. Each pivot stud 37 is made up of a bolt 38 that extends through a bushing 39 and through an opening in the web of the associated beam 11. The bolt 38 is provided with a nut 41 that, when tightened, effectively secures the bolt and the bushing 39 in place rigidly with respect to the associated beam 11.

As will be seen from FIGS. 2 and 3, the tooth bars 18 extend through the openings 17 so that each tooth bar is freely swingable on the pivots 37 between limits defined by the upper and lower edges 42 and 43 of the openings 17. It will also be seen from FIG. 3 that the flat upper face of the web 21 abuts against the straight edge 42 at the upper portion of each opening 17, such edge 42 constituting a stop determining the angled position of the associated tooth bar 18. The other position is determined by the similar flat or straight edge portion 43 against which the outer face of the front flange 22 is adapted to abut, the tine portions 26 being in a substantially vertical position in said other position.

As disclosed and claimed in the above-identified parent application, means is provided for locking the tooth bars so as to hold the tines 26 in their vertical position. The means to this end comprises a locking bar 50 carried by each beam member 11. Each locking bar comprises an elongated strap member 51 and a plurality of slotted brackets 52 carried thereby. Each slotted bracket 52 and the slot 53 therein are dimensioned so as to slidably engage and be supported on the bushings 39. The vertical dimension of the bracket 52 is such that when the locking bar 50 is shifted rearwardly or to the left as viewed in FIG. 1 and to the right as viewed in FIGS. 2 and 3, the lower edges 54 of the respective brackets 52 move into position over the flat upper faces 21 of the associated tooth bar 18 and lock the latter in lower positions with the flanges 22 against the straight edge sections 43 of the beam openings 17. Each bracket 52 is beveled at the rear corners, as indicated at 55 in FIG. 2. This facilitates movement of the locking members into locking position (FIG. 2). It will be seen, therefore, that whenever the locking bars 50 are shifted rearwardly from the position shown in FIG. 3 to the position shown in FIG. 2, the tooth bars are locked into a position holding the tines 26 vertical. The locking bars 50 may be secured in locking position by any suitable means, such as a bolt 56 that extends through the associated channel member 11 and through a slotted bracket 58 carried by the bar 50. The outer end of the bolt 56 carries a wing nut 59, that, when tightened, locks the bar 50 against movement relative to the associated beams 11.

According to this invention, the double tined spring teeth 24 and the channel-like tooth bars 18 are of particular construction and arranged so as to reduce or eliminate objectional vibration and breakage of the teeth. As will be seen from FIG. 2, the diameter of each of the coil portions 25 of the teeth is such that when the opposite side portions of the coils engage the inner faces of the divergent flanges 22 and 23 of the associated tooth bar 18, there is a substantial clearance 60 between the upper portion of each coil and the adjacent inner face of the channel web 21. Also, the spring members 24 are formed so that when the attachment sections 28 (FIG. 1) are bolted in place, the coil sections 25 are resiliently held in wedging relation between the flanges 22 and 23 as shown in FIGS. 2 and 3. It will be seen that each tine portion 26 extends generally downwardly from the associated coil portion 25 so as to be tangent to the coil at a point indicated generally at 61 that lies below the point of contact, indicated at 62, between the adjacent portion of the coil and the adjacent tooth bar flange 22.

When the tine 26 is deflected rearwardly, as by striking an obstruction, the coil portion adjacent the upper end of the tine section is momentarily shifted away from contact with the flange 22 and the tine end of the coil 25, and the tine iself, moves generally about the point of contact 63 between the rear portion of the coil, at the tine end thereof, and the rear flange 23. As soon as the obstruction is passed, the resiliency of the coil portion causes the coil 25 to move back into contact with the front flange 22, at 62, and then as the coil expands and the tine begins to move forwardly, the upper portion thereof rubs or slides against the inner face of the flange 22 whereby the latter serves as a damping means and materially reduces the rebounding action of the tooth. This frictional snubbing or damping action is augmented further by the inherent resiliency of the tooth member and its mounting tending to act at all times to keep the coils 25 wedged in between the divergent flanges and by the fact that the coils never bottom within the channel bars 18.

The above mentioned frictional snubbing or damping action that restrains and eliminates objectional rebounding of the tines 26 is an important feature of this invention, and one particular tooth formation by which this result is secured is shown by way of illustration in FIG. 5. The axially outer portion of each coil 25, there being only one shown in FIG. 5, that engages the flange 22 is the section against which most of the snubbing action is effective, because this is the portion of the coil that deflects the greatest amount when the tooth is flexed rearwardly, or to the right as viewed in FIG. 2. In order to ensure contact at this point, as indicated at 62 in FIG. 5, each of the coils 25 of the tooth member 24 is particularly formed and shaped so that the axis of the coil lies at a slight angle with respect to the adjacent axis of the channel-like tooth bar 18. The axis is indicated by the reference character $a$ in FIG. 5. By arranging and shaping the coil in this way, wedging contact with the flanges 22 and 23 is had at generally two diagonally opposite points as indicated at 62 and 63 in FIG. 5. To secure this particular coil configuration requires a separate and additional bending action, for in the normal or usual way of winding double coil teeth, the coil axes indicated at $b$ in FIG. 6 generally lie at an angle with respect to the axis of the channel bar that is opposite to the angle of the axis $a$ shown in FIG. 5.

In order to eliminate this extra bending operation in the manufacture of the coiled teeth, I propose to allow the coils to take the normal position, with the axes $b$ (FIG. 6) lying at an angle to the bar axis that is directly opposite to the angle shown in FIG. 5. In order to assure contact between the outermost turn or tine end of the coil and the adjacent flange 22, as indicated at 62 in FIG. 6, the coil sections 25a (FIG. 6) are themselves made conical, which can be done without a separate bending operation, so that frictional snubbing contact between the coil section 25a is still had between the opposite sides of the coil, as shown at 62 and 62b in FIG. 6, with clearance $c^1$ between the inner portion of the coil 25a and the forward flange 22 and somewhat greater clearance $c^2$ between the inner end of the coil and the rear flange 23, and with even greater clearance between the top of the coil and the upper web 21 of the bar 18 than is indicated at 60 in FIG. 2.

While I have shown and described above the preferred structure in which the principles of the present invention have been incorporated, it is to be understood that my invention is not to be limited to the particular details, shown and described above, but, in fact, widely different means may be employed in the practice of the broader aspects of my invention.

What I claim, therefore, and desire to secure by Letters Patent is:

1. In a spring tooth harrow, a tooth bar comprising a channel-like member having a central web and two outwardly divergent flanges, a spring tooth comprising a generally straight tine portion and a coil portion comprising a plurality of turns, the external diameter of which is such that when the coil portion is disposed against the inner faces of both said divergent flanges, said coil portion is spaced from the inner face of said web section and the space being open and unobstructed, said tine portion extending generally tangentially from said coil portion at a point spaced from the adjacent point of contact of said coil portion with the adjacent flange, the angle between said flanges being appreciably less than a right angle, and means fixing said tooth to said tooth bar so that generally opposite sides of said coil portion are held wedgingly against said flanges.

2. In a spring tooth harrow, a tooth bar comprising a channel-like member having a central web and outwardly divergent flanges, a spring tooth comprising a generally straight tine portion and a coil portion comprising a plurality of turns, the external diameter of which is such that when the coil portion is disposed against the inner faces of said divergent flanges, said coil portion is spaced from the inner face of said web section and said divergent flanges engage opposite sides of said coil portion at points spaced from the adjacent diameter of said coil portion, said tine portion extending generally tangentially from said coil portion at a point spaced from the adjacent point of contact of said coil portion with the adjacent flange, an attaching section connected with the end of said coil portion opposite said tine portion and angled relative to the plane of said tine portion so as to fit against the adjacent tooth bar flange when the bar is horizontal and the tine portion vertical.

3. In a spring tooth harrow, a tooth bar comprising a channel-like member having a central web and outwardly extending flanges, a spring tooth comprising a generally straight tine portion and a coil portion comprising a plurality of turns, the external diameter of which is such that when the coil portion is disposed against the inner faces of said flanges, said coil portion is spaced from the inner face of said web section, said spring tooth having an attaching section connected with the end of said coil portion opposite said tine portion and angled relative to said coil portion so that when the attaching section is fixed to said tooth bar the coil turns immediately adjacent the tine portion are resiliently held against the adjacent tooth bar flange.

4. In a spring tooth harrow, a tooth bar comprising a channel-like member having a central web and outwardly divergent flanges, a spring tooth comprising a generally straight attaching portion engageable with one of said flanges, said coil portions and said attaching portion being shaped so that the axes of said coil portions extend toward the plane of said attaching portion, whereby the axially outer turn of each coil portion is resiliently held in contact with said one flange, and said spring tooth including a tine section extending generally tangentially outwardly of the axially outer turn of each coil portions at a point adjacent the point of contact of each outer turn with said one flange.

5. In a spring tooth harrow, a tooth bar comprising a channel-like member having a central web and outwardly divergent flanges, a spring tooth comprising a generally straight attaching portion engageable with one of said flanges, and a pair of coil portions connected at their axially inner ends with said attaching portion, said coil portions and said attaching portion being shaped so that the axes of said coil portions extend divergently away from the plane of said one flange, and said coil portions being of conical configuration with the smaller ends connected to said attaching portion, the larger ends of said coil portions engaging the inner faces of said flanges notwithstanding non-alignment of the axes of said coil portions.

References Cited in the file of this patent
UNITED STATES PATENTS
1,086,015 Billhorn _____ Feb. 3, 1914